United States Patent
Staines

(10) Patent No.: US 9,834,254 B2
(45) Date of Patent: Dec. 5, 2017

(54) MOTOR VEHICLE INSTRUMENT PANEL WITH SLIDING COVER OVER CRUSH SPACE

(71) Applicant: FORD GLOBAL TECHNOLOGIES, LLC, Dearborn, MI (US)

(72) Inventor: Bradley Staines, Bishops Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/212,380

(22) Filed: Jul. 18, 2016

(65) Prior Publication Data

US 2017/0021869 A1 Jan. 26, 2017

(30) Foreign Application Priority Data

Jul. 20, 2015 (GB) .................................. 1512666.7

(51) Int. Cl.
*B62D 25/14* (2006.01)
*B60R 13/02* (2006.01)

(52) U.S. Cl.
CPC .......... *B62D 25/14* (2013.01); *B60R 13/0256* (2013.01); *B60R 2013/0287* (2013.01)

(58) Field of Classification Search
CPC ................ B62D 25/14; B60R 13/0256; B60R 2013/0287
See application file for complete search history.

(56) References Cited

U.S. PATENT DOCUMENTS

| | | | |
|---|---|---|---|
| 2,497,261 A | 2/1950 | Hicks | |
| 2,818,933 A | 1/1958 | Tell | |
| 4,146,263 A | 3/1979 | Watari | |
| 2002/0014788 A1* | 2/2002 | Fujita | B60K 37/00 296/192 |
| 2005/0121890 A1 | 6/2005 | Kong | |
| 2008/0203754 A1 | 8/2008 | Towne et al. | |
| 2011/0049933 A1 | 3/2011 | Serizawa et al. | |
| 2015/0035318 A1 | 2/2015 | Serizawa et al. | |
| 2016/0264180 A1* | 9/2016 | Kuwabara | B60S 1/0488 |

FOREIGN PATENT DOCUMENTS

| | | |
|---|---|---|
| DE | 10 2010 023 483 A1 | 1/2011 |
| DE | 102010023483 A1 | 1/2011 |
| JP | H05319278 A | 12/1993 |
| JP | H08 132921 A | 5/1996 |
| JP | H08132921 A | 5/1996 |
| JP | 2005238915 A | 9/2005 |
| JP | 2012076532 A | 4/2012 |

OTHER PUBLICATIONS

Combined Search and Examination Report dated Jan. 25, 2016 for corresponding App. No. GB1512666.7.

* cited by examiner

*Primary Examiner* — Faye M Fleming
(74) *Attorney, Agent, or Firm* — Frank A. MacKenzie; Brooks Kushman P.C.

(57) ABSTRACT

A motor vehicle having an instrument panel that is spaced rearward away from a bottom end of a windscreen so that it is less likely to be damaged in the event of a frontal impact. A cover is attached to vehicle body structure adjacent to the bottom end of the windscreen to cover the gap produced by spacing the instrument panel from the bottom of the windscreen. The cover overlies an upper surface of the instrument panel and slides rearward over the upper surface when the bottom end of the windscreen moves rearward into the crush space during a collision.

14 Claims, 3 Drawing Sheets

MOTOR VEHICLE INSTRUMENT PANEL WITH SLIDING COVER OVER CRUSH SPACE

CROSS-REFERENCE TO RELATED APPLICATIONS

This application claims foreign priority benefits under 35 U.S.C. §119(a)-(d) to GB 1512666.7 filed Jul. 20, 2015, which is hereby incorporated by reference in its entirety.

TECHNICAL FIELD

This invention relates to a motor vehicle having an instrument panel.

BACKGROUND

It is well known to provide a motor vehicle with an instrument panel (often alternatively referred to as a dashboard) mounted in a passenger compartment of the motor vehicle and extending across the width of the passenger compartment of the motor vehicle.

Various instruments are mounted in the instrument panel and it also often houses ducting for part of a ventilation system of the motor vehicle and in some cases one or more airbags

SUMMARY

FIG. 1 is a schematic side view of a prior art motor vehicle 1 showing a conventionally mounted instrument panel 10 in a passenger compartment 6 of the motor vehicle 1. The motor vehicle 1 comprises a roof 2, a floor 3, a windscreen 4 and a firewall or bulkhead 5 separating the passenger compartment 6 from a front compartment 7. In a motor vehicle having a front mounted engine the engine is mounted in the front compartment 7 and in a motor vehicle having a rear mounted engine the front compartment 7 forms a luggage storage area.

A windscreen frame (not shown) for housing the windscreen 4 is joined at a bottom end to other structural components of the motor vehicle 1 including the bulkhead 5.

The instrument panel 10 is mounted on the bulkhead 5 or is mounted on a cross-vehicle beam (not shown), in either case, the instrument panel 10 abuts against a bottom end of the windscreen 4.

In the event of a severe frontal collision a front end of the motor vehicle 1 is designed to crush so as to absorb energy as is well known in the art.

For small vehicles and, particularly, small rear-engined vehicles, maximum utilization of the available crush space is critical in order to deliver good crash performance. Where the available crush length is small such as A-class and City vehicles there may be some level of intrusion to the structure supporting the bottom of the windscreen if the frontal impact is severe. That is to say, a bottom end of the windscreen is located within a front crush zone of the motor vehicle. Such intrusion can result in parts of the instrument panel becoming detached or breaking and thereby constituting a risk to an occupant of the motor vehicle.

It is an object of the invention to reduce the risk of instrument panel damage in the event of a frontal collision.

According to the invention there is provided a motor vehicle having a body structure defining a passenger compartment, an elongate instrument panel mounted in the passenger compartment, a windscreen having a bottom end attached to the body structure of the motor vehicle wherein the instrument panel is spaced away from the bottom end of the windscreen so as to define a gap therebetween and a cover is provided to cover the gap between the bottom end of the windscreen and an upper surface of the instrument panel.

The body structure may include a bulkhead separating the passenger compartment from a front compartment of the motor vehicle and the instrument panel may be spaced away from the bulkhead.

The instrument panel may only be connected at each end to the body structure of the vehicle.

The instrument panel may include a mounting beam that is used to support the instrument panel and connect the instrument panel at each end to the body structure of the vehicle.

The cover may have a first end connected to the body structure of the motor vehicle adjacent to the bottom end of the windscreen and a second end that is positioned during normal use upon the upper surface of the instrument panel.

If the longitudinal dimension of the gap between the bottom end of the windscreen and the instrument panel reduces, the second end of the cover may be arranged to slide over the upper surface of the instrument panel.

The bottom end of the windscreen may be located in a front crush zone of the motor vehicle and the gap may position the instrument panel away from the bottom end of the windscreen out of the front crush zone of the motor vehicle.

The motor vehicle may be a rear-engined motor vehicle.

The invention will now be described by way of example with reference to the accompanying drawing of which:

DETAILED DESCRIPTION

Figure 1:
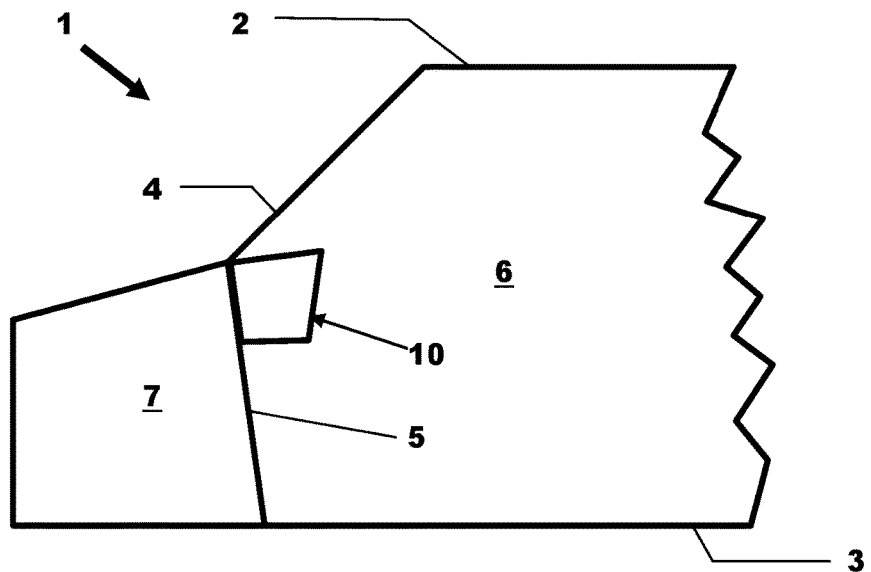
FIG. 1 is a schematic side view of a prior art motor vehicle showing a conventionally mounted instrument panel in a passenger compartment of the motor vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 2 to 5 there is shown a small rear-engined motor vehicle 101 having a roof 102, a floor 103, a windscreen 104 and a firewall or bulkhead 105 separating a passenger compartment 106 from a front compartment 107. In this case, because the motor vehicle 101 has a rear mounted engine (not shown), the front compartment 107 forms a luggage storage area for the motor vehicle 101.

A distance "D" from a front end of the motor vehicle 101 to a bottom end of the windscreen 104 is small so that a corresponding crush distance (CD1 on FIG. 4) is small.

A windscreen frame for housing the windscreen 104 is structurally joined at a bottom end to other structural components of the motor vehicle 101 forming part of a body structure of the motor vehicle 101 such as the bulkhead 105.

An instrument panel 110 is mounted on a laterally-extending cross-vehicle beam 115 that is connected at opposite lateral ends to part of the body structure of the motor vehicle 101.

The instrument panel 110 is connected at each end to the body structure of the vehicle via the mounting beam 115 which both supports the instrument panel 110 and connects it at each end to the body structure of the vehicle 101. The instrument panel 110 extends across the entire width of the passenger compartment 106. The instrument panel 110 is spaced away from the bulkhead 105 and there are no structural connections between the bulkhead 105 and the instrument panel 110.

The windscreen 104 of the motor vehicle 101 has a bottom end attached via a bonding strip 109 to the body structure of the motor vehicle 101. The instrument panel 110 is spaced away from the bottom end of the windscreen 104 so as to define a gap "G" therebetween and a cover 120 made from a plastic material is provided to cover the gap "G" between the bottom end of the windscreen 104 and an upper surface 110u of the instrument panel 110.

Figure 5:
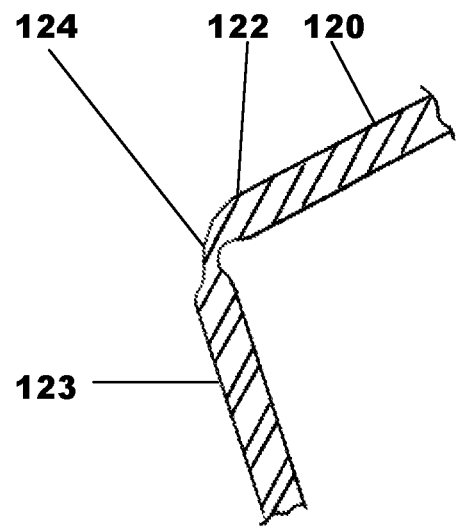
FIG. 5 is an enlarged cross section in the region "R" on FIG. 4 showing a living hinge forming part of the cover.
Figure 4:
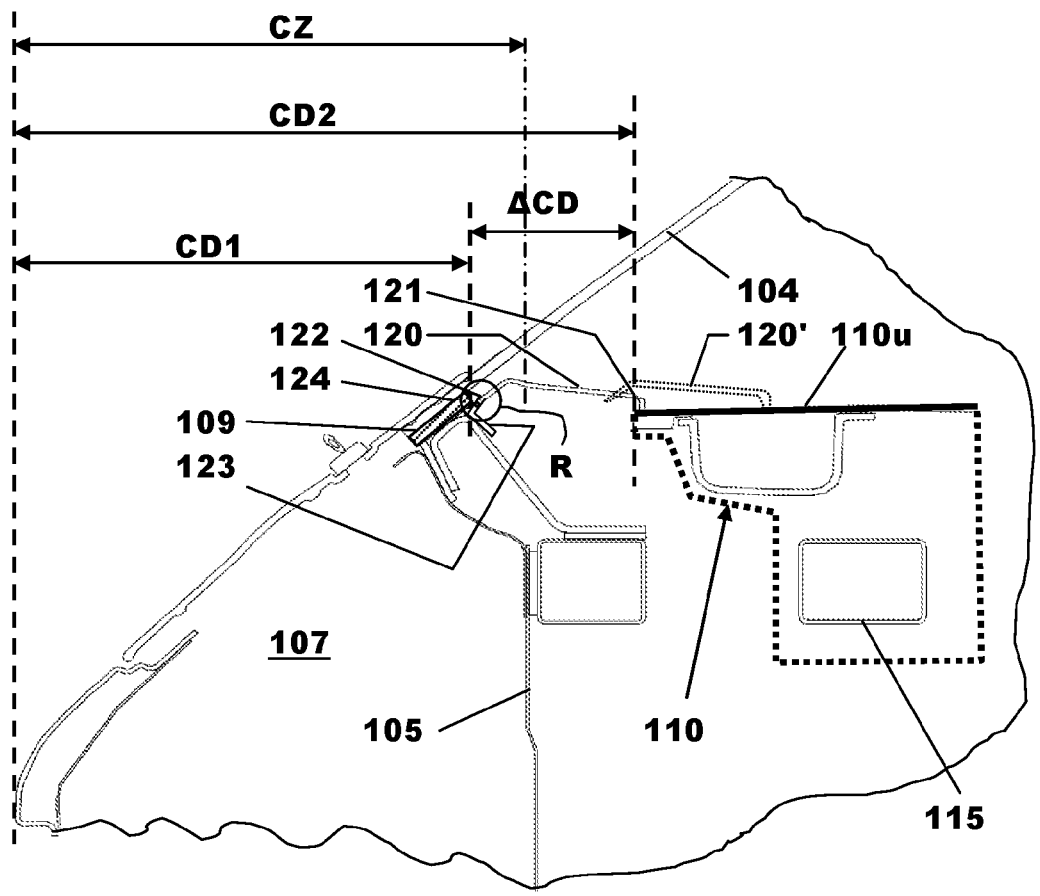
FIG. 4 is side view similar to FIG. 2 but showing in more detail the positioning of the instrument panel and a cover used to bridge a gap between the instrument panel and a bottom end of a windscreen of the motor vehicle.

As best seen in FIGS. 4 and 5 the cover 120 has a first/rear end 121 that rests upon the upper surface 110u of the instrument panel 110 or, to be more precise, upon trim forming the upper surface of the instrument panel 110 and has a second/front end 122 connected to a fastening member which in this case is in the form of an elongate fastening strip 123 used to connect the cover 120 to part of the body structure of the motor vehicle 101. It will be appreciated that prior to impact the cover 120 may be attached to the instrument panel 110 in a frangible manner to prevent rattling. The attachment of the cover 120 to the instrument panel 110 is easily broken when a load is applied to it so as not to prevent sliding of the cover 120.

A living hinge 124 provides a rotatable connection between the second/front end 122 of the cover and the fastening strip 123.

It will be appreciated that the cover 120, the fastening strip 123 and the living hinge 124 are all formed as integral parts of a single component made from a plastic material.

In FIG. 4 when the cover is in a pre-impact position it is indicated by the reference number 120 when the cover is in a post impact position it is shown in dotted outline referenced 120'. Note that only the cover 120' is shown in the post impact position and not the support structure for the cover 120'.

The post impact position corresponds to a situation where the bottom end of the windscreen 104 has moved back and the gap "G" between the bottom end of the windscreen 104 and the instrument panel 110 has been absorbed by the impact. It will be appreciated that the instrument panel 110 has not moved it is the relative movement between the bottom end of windscreen 104 and the instrument panel 110 that results in a diminishing in the longitudinal dimension of the gap "G".

Because the cover 120 rides up onto and slides across the upper surface 110u of the instrument panel 110 no significant force is transferred to the instrument panel 110 until all the gap "G" is absorbed. The longitudinal dimension of the gap "G" is therefore set to be as large as possible taking into account packaging constraints for the instrument panel 110 such as the distance required between the instrument panel 110 and any occupants of the motor vehicle 101. The longitudinal dimension of the gap "G" is set so as to move the instrument panel 110 out of a front crush zone CZ of the motor vehicle 101.

The longitudinal dimension of the gap "G" is typically, by way of example and without limitation, in the range of 0.020 to 0.120 m as such a gap provides a good compromise between packaging and improved crash properties.

In FIG. 4 the difference in available crush distance between a motor vehicle having an instrument panel mounted adjacent to a bottom edge of a windscreen and a motor vehicle constructed in accordance with this invention having the instrument panel mounted so that a gap is present is shown.

In the case of a prior art motor vehicle the available crush distance is shown as CD1. When the crush distance CD1 is used up due to collapse of the front of the vehicle resulting from a frontal impact, a considerable force will be transferred from the body structure of the motor vehicle into the instrument panel because it abuts the lower edge of the windscreen 104.

Figure 2:
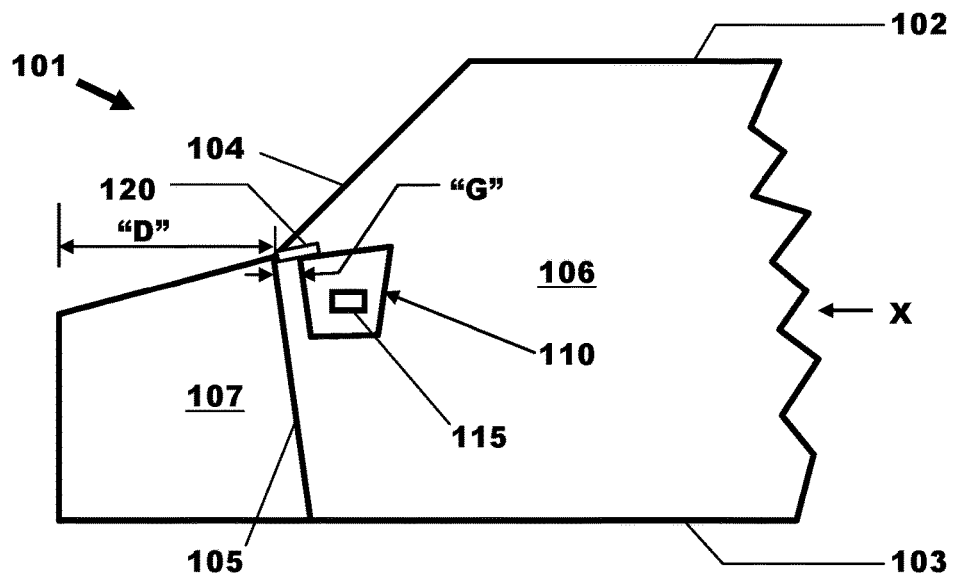
FIG. 2 is a schematic side view similar to FIG. 1 but showing how an instrument panel is mounted in a passenger compartment of a motor vehicle constructed in accordance with the invention.
Figure 3:
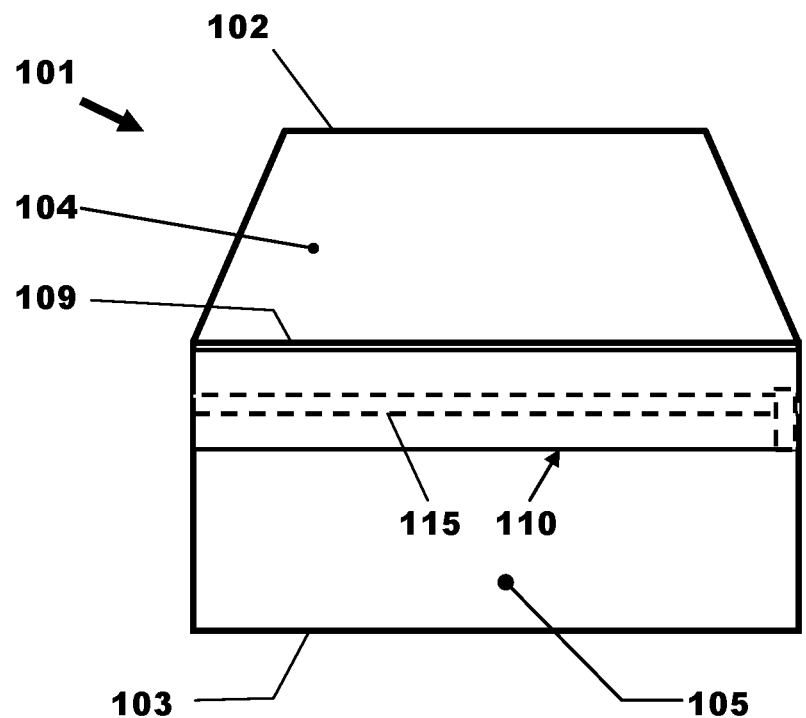
FIG. 3 is a schematic view in the direction of arrow X on FIG. 2.

In the case of a motor vehicle constructed in accordance with this invention, an available crush distance CD2 is provided. Therefore, it is not until the increased crush distance CD2 is used up will any force be transferred from the body structure of the motor vehicle 101 into the instrument panel 110. The difference in crush distance $\Delta CD$ between CD2 and CD1 corresponds to the longitudinal dimension of the gap "G" between the bottom end of the windscreen 104 and the instrument panel 110 as shown in FIG. 2. The corresponding crush zone CZ for the motor vehicle 101 for a predefined serious crash condition will be greater than CD1 but less than CD2 as indicated by the double headed arrow CZ on FIG. 4.

The function of the cover 120 is to cover the gap "G" between the bottom end of the windscreen 104 and the instrument panel 110 so as to provide an aesthetically pleasing appearance and to prevent objects placed upon the upper surface 110u from falling down behind the instrument panel 110.

Although the invention has been described with reference to an instrument panel that is supported by a structural beam it will be appreciated that other types of construction could be used for the instrument panel so as to provide it with sufficient rigidity and strength to be supported only at each end. For example and without limitation, the instrument panel can include a skeletal body that is used to support the instrument panel and connect the instrument panel at each end to the body structure of the vehicle. For example, the instrument panel could have a die cast core and an overlying fascia member. See for example the instrument panel construction disclosed in Patent Publication WO2005/021362.

Furthermore the invention is not limited to the use of a living hinge other types of connection allowing the cover to rotate relative to the body structure so as to allow it to ride up onto and slide across the upper surface of the instrument panel could be used such as, for example, one or more conventional mechanical hinges. Alternatively, the cover could have a first end attached to the body structure near the bottom end of the windscreen and a second end resting upon the upper surface of the dashboard during normal use and be made from a resilient flexible material enabling it to flex or bend sufficiently near its first longitudinal edge to permit the second edge to slide over the upper surface of the instrument panel when the gap is reduced due to a frontal impact.

As yet another alternative the cover could have a first end attached to the body structure near the bottom end of the windscreen, a second end attached to the instrument panel and have a number of corrugations running substantially parallel to the lower end of the windscreen. The corrugations facilitate the easy collapse of the cover between the first and second ends when the longitudinal dimension of the gap between the bottom end of the windscreen and the instrument panel reduces.

The connection means used to attach the cover to the body structure in all cases is such that it tethers the cover to the body structure during a frontal impact.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle having body structure defining a passenger compartment, comprising:
    a windscreen having a bottom end attached to the body structure;
    an instrument panel mounted in the passenger compartment, spaced rearward from the bottom end to define a longitudinal gap therebetween, and including a skeletal body connected to the body structure only at opposite lateral ends of the instrument panel; and
    a cover covering the gap between the bottom end of the windscreen and an upper surface of the instrument panel, the cover having a forward end connected to the body structure of the motor vehicle adjacent to the bottom end of the windscreen and a rear end positioned during normal use upon the upper surface of the instrument panel wherein, if a longitudinal dimension of the gap between the bottom end of the windscreen and the instrument panel reduces, the rear end of the cover is able to slide over the upper surface of the instrument panel.

2. The motor vehicle of claim 1 wherein the instrument panel is mounted on a cross-vehicle mounting beam connected at opposite ends to the body structure of the vehicle.

3. The motor vehicle of claim 1 wherein the body structure includes a bulkhead separating the passenger compartment from a front compartment of the motor vehicle, the instrument panel being spaced rearward from the bulkhead and there being no structural connections between the bulkhead and the instrument panel.

4. The motor vehicle of claim 1 wherein the bottom end of the windscreen is located in a front crush zone of the motor vehicle and the gap positions the instrument panel away from the bottom end of the windscreen out of the front crush zone of the motor vehicle.

5. The motor vehicle of claim 1 wherein the motor vehicle is a rear-engined motor vehicle.

6. Motor vehicle structure comprising:
    a windscreen having a bottom;
    an instrument panel (IP), spaced from the bottom, including a skeletal body connected to vehicle body structure (VBS) only at opposite lateral ends of the IP; and
    a cover having a forward end connected to the VBS adjacent the bottom, and a second end, overlying an upper surface of the IP, and slidable rearward over the upper surface upon the bottom moving rearward relative to the IP.

7. The motor vehicle structure of claim 6 wherein the IP is mounted on a cross-vehicle mounting beam connected at opposite ends to the VBS.

8. The motor vehicle structure of claim 6 wherein the VBS includes a bulkhead separating a passenger compartment from a front compartment of a motor vehicle, the IP being spaced rearward from the bulkhead and there being no structural connections between the bulkhead and the IP.

9. The motor vehicle structure of claim 6 wherein the bottom is located in a front crush zone of a motor vehicle and the IP is rearward of the front crush zone.

10. Motor vehicle structure comprising:
    a windscreen having a bottom;
    an instrument panel (IP), rearward of the bottom, including a skeletal body connected to vehicle body structure (VBS) only at opposite lateral ends of the IP; and
    a cover having a forward end connected to the VBS adjacent the bottom, and a rear end, overlying an upper surface of the IP slidable rearward over the upper surface when the bottom moves rearward relative to the IP.

11. The motor vehicle structure of claim 10 wherein the IP is mounted on a cross-vehicle mounting beam connected at opposite ends to the VBS.

12. The motor vehicle structure of claim 10 wherein the VBS includes a bulkhead separating a passenger compartment from a front compartment of a motor vehicle, the IP being spaced rearward from the bulkhead and there being no structural connections between the bulkhead and the IP.

13. The motor vehicle structure of claim 10 wherein the bottom is located in a front crush zone of a motor vehicle and the IP is rearward of the front crush zone.

14. The motor vehicle structure of claim 10 wherein the forward end comprises a strip attached to the VBS and a living hinge connects the forward end to a rear end of the cover which overlies the upper surface.

* * * * *